United States Patent Office 3,824,317
Patented July 16, 1974

3,824,317
THIOSEMICARBAZONE FUNGICIDES
Roger Williams Addor, Pennington, and Glentworth Lamb, Trenton, N.J., assignors to American Cyanamid Company, Stamford, Conn.
No Drawing. Original application Feb. 17, 1972, Ser. No. 227,287, now Patent No. 3,761,492, dated Sept. 25, 1973. Divided and this application Apr. 13, 1973, Ser. No. 351,109
Int. Cl. A01n 9/12, 9/20
U.S. Cl. 424—277                7 Claims

ABSTRACT OF THE DISCLOSURE

The present invention relates to compounds of the formula:

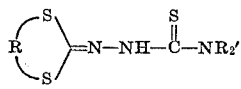

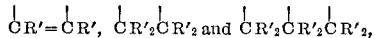

wherein R is a member selected from the group consisting of and the R's are independently hydrogen or lower alkyl of $C_1$–$C_4$. It further relates to controlling fungi and protecting crops from attack by fungus organisms with the above compound.

---

This is a divisional of application, Ser. No. 227,287, filed on Feb. 17, 1972, now Pat. No. 3,761,492, issued on Sept. 25, 1973.

This invention relates to novel compounds having the formula:

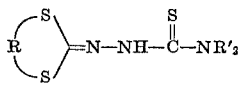

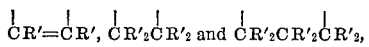

wherein R is a member selected from the group consisting of and the R's are independently hydrogen or lower alkyl of $C_1$–$C_4$. It further relates to a method for controlling fungi with the above-identified compounds and to the use of such compounds for protecting agronomic crops, both growing and harvested, from attack by pathogenic fungus organisms.

The above compounds can be synthesized by reacting the acid salt of the appropriate 2-imino derivative of 1,3-dithiole, 1,3-dithiolane or 1,3-dithiane and thiosemicarbazide or the appropriate derivative thereof.

Reaction is conveniently induced by admixing the iminodithiole, dithiolane or dithiane with the selected thiosemicarbazide in sufficent amount to provide a mole ratio of the heterosulfur compound to the thiosemicarbazide of from 1:1.5 to 1.5 to 1. The temperature of the mixture is maintained between about 50° C. and 125° C. The pH of the reaction mixture is maintained below 7.0. The reaction is conducted in the presence of a solvent selected from the group consisting of water, lower alkyl alcohols and mixtures thereof. Suitable loweralkyl alcohols include methanol, ethanol, isopropanol, n-propanol, n-butanol and 2-butanol.

In a preferred embodiment of the above process approximately equimolar amounts of the hetero sulfur compound and the thiosemicarbazide are utilized. Also, the temperature of the reaction mixture is preferably maintained between about 75° C. and 70° C., the pH is maintained between 1.0 and 6.0 and the preferred solvent is water.

Moreover, it has been found that the bisulfate, hydrochloride and hydrobromide salts of the 2-imino-dithioles, dithiolanes or dithianes may be used in the instant process, however, the bisulfate salts appear to be the preferred species.

These reactions may be graphically written as follows:

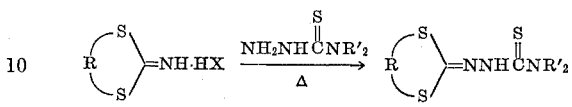

wherein R and R' are as defined above and X is $SO_4^=$, $Br^-$ or $Cl^-$.

Illustrative compounds of Formula I include, for example, 4-methyl-1,3-dithiolan-2-one thiosemicarbazone,
4,5-dimethyl-1,3-dithiolan-2-one thiosemicarbazone,
4-n-butyl-1,3-dithiolan-2-one thiosemicarbazone,
1,3-dithian-2-one thiosemicarbazone,
4,4-dimethyl-1,3-dithiolan-2-one thiosemicarbazone,
1,3-dithiolan-2-one thiosemicarbazone,
4-methyl-1,3-dithiol-2-one thiosemicarbazone,
1,3-dithiolan-2-one 4-methylthiosemicarbazone,
4-ethyl-1,3-dithiolan-2-one thiosemicarbazone,
1,3-dithiolan-2-one 4,4-dibutyl thiosemicarbazone,
4,4,5,5-tetramethyl-1,3-dithiolan-2-one thiosemicarbazone,
4,5-dimethyl-1,3-dithiol-2-one thiosemicarbazone,
4-methyl-1,3-dithian-2-one thiosemicarbazone,
4,5,6-trimethyl-1,3-dithian-2-one thiosemicarbazone, and the like.

Methods for the preparation of the 2-imino-1,3-dithioles, 2-imino-1,3-dithiolanes and 2-imino-1,3-dithianes (i.e., the starting materials for the compounds of the present invention) are described in the Addor U.S. Pats. 3,197,481, 3,364,230, 3,389,147, 3,193,561, and the Lies U.S. Pats. 3,342,835 and 3,449,366.

For use in controlling fungi, the above compounds are brought into contact with the fungi to be controlled. For ease in application, one or more of the active ingredients is preferably formulated in effective or fungitoxic amount with a conventional agricultural adjuvant, such as a solid or liquid inert carrier, diluent or other formulation aid.

For use in the treatment or protection of growing plants or agronomic crops from pathogenic fungi, the compounds are applied to the crops to be protected. The compounds are preferably formulated as dusts, dust concentrates, wettable powders or the like, and applied by conventional equipment, as by spraying or dusting the foliage of said plants or harvested crops.

Dusts are usually prepared by grinding together from about 1% to 15% by weight of the active ingredient and from about 99 to 85% by weight of a finely divided inert diluent or carrier. Kaolin, attapulgite, diatomaceous earth, talc and fuller's earth are typical carriers useful in the preparation of such dust formulations. If desired, it has also been found that sticking agents may be incorporated in these formulations but are not essential.

Dust concentrates are prepared in the same manner as the more dilute dusts but generally contain from about 25% to 90% by weight of the toxicant. In addition to the grinding method referred to above, it is noted that these formulations may also be prepared by dissolving the toxicant in hot acetone or methylene chloride and spraying the toxicant solution on a tumbling bed of a finely divided solid inert carrier. Any of the solid carriers described above may be employed in these formulations.

Wettable powders are usually prepared in the same manner as the dust formations excepting that in addition to the toxicant and carrier there is also generally added from about 1% to 5% by weight of a dispersing agent such as an alkali metal lignosulfonate and from about 1% to 5% by weight of a wetting agent. Wetting agents such as sodium N-methyl-N-oleoylturate and sodium alkylnaphthalene sulfonate are suitable for this purpose.

In practice, the wettable powders are generally dispersed in water or other relatively inexpensive liquid such as deodorized kerosene and applied to the crops sought to be protected, as liquid sprays. From about 20 to 400 gallons of liquid, containing from about ¼ to 8 lbs. of active ingredient is generally used per acre of crops being treated.

Typical wettable powder formulations are set forth in Table I below:

TABLE I

| Formulation number | Percent | Ingredients |
|---|---|---|
| A | 33.3 | 4-methyl-1,3-dithiolan-2-one thiosemicarbazone. |
|  | 63.2 | Clay carrier.[a] |
|  | 2.0 | Sodium lignin sulfonate. |
|  | 1.5 | Sodium N-methyl-N-oleoyl taurate. |
| B | 50.0 | 4-methyl-1,3-dithiol-2-one thiosemicarbazone. |
|  | 46.0 | Diatomaceous earth. |
|  | 2.0 | Sodium lignosulfonate. |
|  | 2.0 | Ester of sodium isethionate. |
| C | 40.0 | 1,3-dithian-2-one thiosemicarbazone. |
|  | 56.5 | Clay carrier.[a] |
|  | 2.0 | Sodium lignin sulfonate. |
|  | 1.5 | Alkyl phenoxy polyethylene ethanols. |

[a] Attaclay ® by the Attapulgus Clay Company.

The invention and preparation of the active ingredients are further illustrated by the examples set forth below, which are not to be taken as being limitative thereof. Unless otherwise specified, all parts and percentages are by weight.

EXAMPLE 1

Preparation of 4-methyl-1,3-dithiolan-2-one thiosemicarbazone

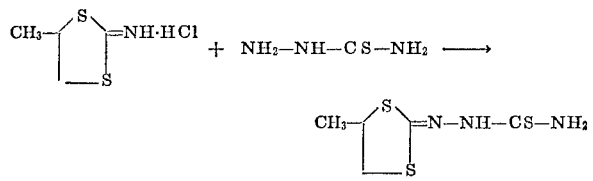

4-Methyl-2-imino-1,3-dithiolane hydrochloride (12.0 g., 0.0707 mole) was dissolved in 100 ml. of water and filtered into a 500 ml. round-bottomed flask equipped with a mechanical stirrer, reflux condenser, and thermometer. Thiosemicarbazide (6.45 g., 0.0707 mole) was added with stirring and the reaction mixture was heated on a steam bath to 70° C. and held there for about 5 minutes. During the heating, complete solution was observed before the product precipitated. After slow cooling and standing for 2 hours, the white solid was collected on a Buchner funnel, washed with water, and dried in vacuum desiccator over KOH to give 7.3 g., m.p. 163–164° C.

A second crop, which crystallized in the mother liquor, was filtered, washed, and dried: wt., 1.2 g., m.p. 162–163° C. The combined crops (8.5 g., 58% yield) were recrystallized from 250 ml. of absolute ethanol to give 7.2 g., m.p. 163–164° C. (with bubbling).

Analysis.—Calcd. for $C_5H_9N_3S_3$: C, 28.96; H, 4.38; N, 20.27; S, 46.40. Found: C, 28.75; H, 4.40; N, 20.09; S, 46.37.

After standing for a week, the reaction mother liquor yielded an additional 4.6 g. of long needles, m.p. 163–164° C. (with bubbling), to bring the total yield to 90%.

For most of the compounds, the reaction mixture was allowed to stand overnight before filtration of crude product, and no attempt was made to recover further crops.

EXAMPLE 2

Preparation of 4-methyl-1,3-dithiol-2-one-thiosemicarbazone

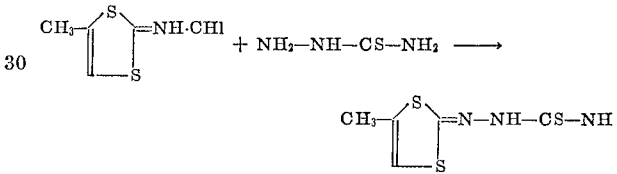

To the imino compound hydrochloride (0.15 mole, 30.8 g.) in 200 ml. of water was added thiosemicarbazide (0.15 mole, 13.7 g.). The reaction mixture was heated to 85° C. when solid began to precipitate. The mixture was cooled and allowed to stand. Several solid crops formed. The best appeared to be third: wt., 3.7 g.; m.p. 119.5–124° C.

Recrystallization from methanol gave 2.7 g. of yellow solid, m.p. 145.5–146° C. Recrystallization from isopropanol gave 1.3 g. of off-white solid, m.p. 149–151° C.

Analysis.—Calcd. for $C_5H_7N_3S_3$: C, 29.26; H, 3.44; N, 20.46; S, 46.85. Found: C, 29.40; H, 3.28; N, 20.54; S, 46.96.

EXAMPLES 3–8

By utilizing the procedure of Example 1 above and substituting the hydrochloride salt of the appropriate hetero sulfur compound and selected thiosemicarbazide for their appropriate counterparts, the compounds set forth in Table II below were prepared.

TABLE II

| Example number | Compound | Reaction Time, minutes | Reaction Temp., °C. | M.P., °C. | Calcd. C | Calcd. H | Calcd. N | Calcd. S | Found C | Found H | Found N | Found S |
|---|---|---|---|---|---|---|---|---|---|---|---|---|
| 3 | CH₃—, CH₃— dithiolane =N-NH-CS-NH₂ | 10 | 65 | a 180–183 | 32.55 | 5.01 | 18.98 | 43.46 | 32.35 | 5.53 | 19.10 | 43.25 |
| 4 | n-C₄H₉— dithiolane =N-NH-CS-NH₂ | 10 | 74 | 137–139 | 38.52 | 6.06 | 16.85 | 38.57 | 38.80 | 6.06 | 16.86 | 38.69 |
| 5 | dithiolane =N—NH-CS—NH₂ | 30 | 65–70 | 170.5–172 | 28.96 | 4.38 | 20.27 | 46.40 | 29.07 | 4.40 | 20.15 | 46.41 |

TABLE II.—Continued

| Example number | Compound | Reaction Time, minutes | Reaction Temp., °C. | M.P. °C. | Calcd. C | Calcd. H | Calcd. N | Calcd. S | Found C | Found H | Found N | Found S |
|---|---|---|---|---|---|---|---|---|---|---|---|---|
| 6 | CH₃,CH₃ C(S-)₂=N-NH-CS-NH₂ | 10 | 70 | 149–154 | 32.55 | 5.01 | 18.98 | 43.46 | 33.08 | 5.22 | 18.82 | 43.13 |
| 7 | (S-)₂C=N-NH-CS-NH-CH₃ | 60 | 65–75 | 153 | 28.96 | 4.38 | 20.27 | 46.40 | 29.23 | 4.40 | 20.20 | 46.06 |
| 8 | (S-)₂C=N—NH—CS—NH₂ | 10 | 75 | *158–160 | | | | | | | | |

*Melts with decomposition.

EXAMPLES 9–13

Following the procedure of Examples 1 or 2 above, the following reactions are effected. The compounds produced thereby are set forth in Table III below.

EXAMPLE 22

The foliage of Bonnie Best Tomato plants with 4 true leaves, and Early Marketeer cucumber plants with 2 true leaves were sprayed with 50/50 acetone/water solutions containing 100 p.p.m. or 500 p.p.m. of test compound. All plants were sprayed to run-off. The plants were allowed to dry and were then sprayed with a mixed inoculum of *Phytophthora infestans* (late blight) and *Col-*

TABLE III $$R_9\text{-}C(S\text{-})_2 = NH \cdot HX + NH_2\text{-}NH\text{-}CS\text{-}N(R_7)(R_8) \xrightarrow{\Delta,\text{ Solvent}} R_9R_{10}C(S\text{-})_2 = N\text{-}NH\text{-}C(S)\text{-}N(R_7)(R_8)$$

| Example number | R₇ | R₈ | R₉ | R₁₀ | Reaction temp. | Solvent | Mole ratio, A:B |
|---|---|---|---|---|---|---|---|
| 9 | CH₃ | H | H | C₂H₅ | 90° | H₂O | 1:1 |
| 10 | CH₃ | CH₃ | C₂H₅ | C₂H₅ | 80° | H₂O | 1:1 |
| 11 | iC₃H₇ | iC₃H₇ | iC₃H₇ | H | 65° | CH₃OH | 1:1.5 |
| 12 | nC₄H₉ | H | H | nC₄H₉ | 118° | BuOH | 1:1 |
| 13 | CH₃ | CH₃ | CH₃ | CH₃ | 80° | H₂O+CH₃OH | 1.5:1 |

EXAMPLES 14–21

Following the procedure of Example 1 above the following reactions are effected. The compounds produced thereby are set forth in Table IV below.

TABLE IV

| Example number | R₁ | R₂ | R₃ | R₄ | R₅ | R₆ | R₇ | R₈ | n | Temp., °C. | Solvent | Mole ratio, C:D |
|---|---|---|---|---|---|---|---|---|---|---|---|---|
| 14 | CH₃ | CH₃ | H | H | H | H | H | H | 1 | 85° | H₂O | 1:1 |
| 15 | | | CH₃ | CH₃ | H | H | H | C₂H₅ | 0 | 90° | H₂O+CH₃OH | 1:1 |
| 16 | | | CH₃ | H | H | CH₃ | CH₃ | H | 0 | 90° | H₂O+CH₃OH | 1:1.5 |
| 17 | | | C₄H₉ | H | H | H | H | H | 0 | 80° | H₂O | 1:1.5 |
| 18 | C₂H₅ | C₂H₅ | H | H | C₂H₅ | C₂H₅ | H | H | 1 | 78° | C₂H₅OH | 1:1 |
| 19 | i-C₃H₇ | H | i-C₃H₇ | H | i-C₃H₇ | H | H | H | 1 | 97° | C₃H₇OH | 1:1 |
| 20 | | | C₄H₉ | H | H | C₄H₉ | C₄H₉ | H | 0 | 118° | C₄H₉OH | 1.5:1 |
| 21 | CH₃ | CH₃ | CH₃ | CH₃ | CH₃ | CH₃ | CH₃ | CH₃ | 1 | 65° | CH₃OH | 1:1 | letotrichum lagenarium (anthracnose). Immediately thereafter the inoculated plants were placed in a constant temperature cabinet at 62° F. and a saturated atmosphere. After 24 hours the temperature was advanced to 70° F. and held there for 72 hours at which time the plants were removed to the greenhouse. Readings on disease control were made 7 days after inoculation, using the following ratings of disease observed: 5=no disease; 4=trace; 3=slight; 2=moderate; 1=severe disease. The results are set forth in Table V below.

TABLE V.—RESULTS OF FOLIAR SPRAY PROTECTIVE TESTS

| Compound | Disease rating | | | |
|---|---|---|---|---|
| | Cuc. anthrac. | | Tom. late blight | |
| | 500 p.p.m. | 100 p.p.m. | 500 p.p.m. | 100 p.p.m. |
| ![structure] =N—NH—CS—NH₂ (dithiolane) | 5 | 5 | 5 | 5 |
| CH₃— =N—NH—CS—NH₂ | 4 | 3 | 5 | 4 |
| n-Bu— =N—NH—CS—NH₂ | 4 | 3 | 5 | 5 |
| CH₃— / CH₃— =N—NH—CS—NH₂ | 4 | 3 | 5 | 5 |
| (CH₃)₂C =N—NH—CS—NH₂ | 3 | 1 | 5 | 4 |
| dithiolene =N—NH—CS—NH₂ | 4 | 2 | 3 | 2 |
| =N—NH—CS—NH—CH₃ | 5 | 5 | 5 | 5 |
| CH₃— (with N) =N—NH—CS—NH₂ | 5 | 5 | 5 | 5 |

EXAMPLE 23

Four groups of tobacco plants (Burley variety—20 plants per group), approximately two weeks old and previously inoculated with the disease organism *Peronospora tabacina*, are sprayed with a 35/65 percent acetone/water mixture containing 50 or 200 p.p.m. of test compound. The sprayed plants are placed in an incubator maintained at 20–25° C. for six days and then removed and examined for disease symptoms. Zineb, a commercial fungicide, and inoculated untreated plants, are used as controls. Data observed are reported as percent control in Table VI below.

TABLE VI

| Compound | Rate, p.p.m. | Percent control |
|---|---|---|
| 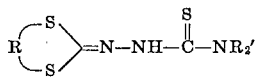 | 50 | 30.0 |
| | 200 | 96.3 |
| Zineb | 50 | 31.3 |
| | 200 | 78.8 |
| Inoculated check | | 0.0 |

We claim:
1. A method for controlling fungi or protecting a growing plant from attack by pathogenic fungi which comprises: applying to said plant or fungi a fungitoxic amount of a compound having the formula:

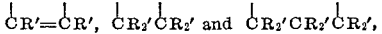

where R is a member selected from the group consisting of $$\overset{|}{C}R'=\overset{|}{C}R', \quad \overset{|}{C}R_2'\overset{|}{C}R_2' \text{ and } \overset{|}{C}R_2'CR_2'\overset{|}{C}R_2',$$

said R's each being hydrogen or lower alkyl of from 1 to 4 carbon atoms.

2. The process according to Claim 1 wherein the compound is 4-methyl-1,3-dithiolan-2-one-thiosemicarbazone.
3. The process according to Claim 1 wherein the compound is 4-methyl-1,3-dithiol-2-one-thiosemicarbazone.
4. The process according to Claim 1 wherein the compound is 1,3-dithiolan-2-one-thiosemicarbazone.
5. The process according to Claim 1 wherein the compound is 1,3-dithiolan-2-one 4-methylthiosemicarbazone.
6. The process according to Claim 1 wherein the compound is 4-n-butyl-1,3-dithiolan-2-one-thiosemicarbazone.
7. The process according to Claim 1 wherein the compound is 4,5 - dimethyl-1,3-dithiolan-2-one-thiosemicarbazone.

References Cited

UNITED STATES PATENTS

| 3,193,561 | 7/1965 | Addor | 260—327 |
| 3,467,672 | 9/1969 | Addor | 260—327 |

ALBERT T. MEYERS, Primary Examiner

A. JAY ROBINSON, Assistant Examiner